United States Patent [19]
Hoeschele, Jr. et al.

[11] 3,906,172
[45] Sept. 16, 1975

[54] DIGITAL ECHO SUPPRESSOR

[75] Inventors: David F. Hoeschele, Jr., Norristown; Eugene H. Barnes, Philadelphia, both of Pa.

[73] Assignee: General Electric Company, Fairfield, Conn.

[22] Filed: Apr. 22, 1974

[21] Appl. No.: 463,091

[52] U.S. Cl. .......... 179/170.6
[51] Int. Cl.$^2$ .......... H04B 3/20
[58] Field of Search .......... 179/170.2, 170.4, 170.6, 179/170.8

[56] References Cited

UNITED STATES PATENTS

| | | | |
|---|---|---|---|
| 3,231,687 | 1/1966 | Riesz | 179/170.2 |
| 3,560,669 | 2/1971 | Foulkes et al. | 179/170.2 |
| 3,562,448 | 2/1971 | May, Jr. | 179/170.6 |
| 3,725,612 | 4/1973 | Campanella et al. | 179/170.6 |
| 3,754,105 | 8/1973 | Poschenrieder et al. | 179/170.2 |
| 3,821,494 | 6/1974 | Bessyre | 179/170.8 |
| 3,826,878 | 7/1974 | Bendel | 179/170.2 |

*Primary Examiner*—William C. Cooper
*Assistant Examiner*—Randall P. Myers
*Attorney, Agent, or Firm*—Allen E. Amgott; Raymond H. Quist; James H. Beusse

[57] ABSTRACT

All digital echo suppressor with break-in circuitry for use in conjunction with a voice-operated switch. During periods when data is not being transmitted or received, both the transmission and reception paths are open circuited by respective voice-operated switches. When data is being received, the echo suppressor prevents the voice-operated switch in the transmission path from enabling transmission unless data to be transmitted is of greater amplitude than data being received.

9 Claims, 2 Drawing Figures

Fig.

DIGITAL ECHO SUPPRESSOR

BACKGROUND OF THE INVENTION:

1. Field of the Invention

This invention relates to echo suppressors and more particularly to an all-digital echo suppressor with break-in capability.

2. Description of the Prior Art

In many communications systems, particularly those used for voice communication, it is normal practice to connect a four-wire system to a two-wire system by a hybrid or other isolation network. The four-wire system provides separate one-way paths for transmission and reception of communication signals while the two-wire system provides a two-way path for both reception and transmission of signals. Because the hybrid or other isolation network does not provide perfect isolation between the separate transmission and reception paths in the four-wire system, a portion of a received signal may be coupled into the transmission system and be returned to sender as echo. For very short distances the time for an echo to return to the sender will be short and the echo will be practically unnoticeable; however, for very long distances the time for echo return becomes relatively long and any echo becomes very disconcerting to the sender.

Prior art systems, particularly analog type systems, have provided echo suppressors which insert relatively large impedances into the transmission path on the four-wire side of a hybrid to reduce echo amplitude whenever a signal is being received. In a break-in mode, commonly referred to as a double-talk mode, the impedance inserted in the transmission path is bypassed and a relatively small impedance is inserted in the receive path on the four-wire side of the hybrid. The condition for a double-talk mode is that a signal is being received from a far-end talker and the signal being generated by the near-end talker is of greater amplitude than the received signal. A predetermined time period after the near-end talker ceases talking, a period normally referred to as hangover time, the system reverts back to its original state, i.e., the large impedance is inserted into the transmission path and the small impedance is removed from the receive path. Hangover time, usually in the order of 150 to 350 milliseconds, prevents the circuitry from switching into and out of the different modes whenever a short pause or a faint syllable occurs.

Prior art echo suppressor systems, whether digital or analog, are characterized by a plurality of switches and by a corresponding complexity of control circuitry for the switches. In general, numerous switches are required since the echo suppressor must provide signal paths for both transmission and reception of signals during a time period in which neither transmission nor reception is occurring but in which the transmission and reception circuitry must be available for either operation. In addition, many communication systems are also provided with voice-operated switches which provide separate control of both transmission and reception paths.

The present invention is directed to a method and apparatus for minimizing the complexity of an echo suppressor in a communication system by providing an echo suppressor for use in conjunction with a voice-operated switch.

SUMMARY OF THE INVENTION

In a preferred embodiment of the invention, voice-operated switches in both the transmission and reception paths of a four-wire communication system provide normally open-circuited communication channels. Only upon detection of either outgoing or incoming signals are the respective transmission and reception paths enabled; hence, control of such paths by the echo suppressor is not required. Generally a VOX produces a signal to either enable a transmitter or a receiver. By diverting the signal from the VOX located in the transmission path through a logic gate, the echo suppressor of the present invention need only provide an inhibit to the logic gate to block the enable signal to the transmitter when the incoming signals are of greater amplitude than the outgoing signals thus considerably reducing the complexity of the echo suppressor circuitry. The echo suppressor also includes logic circuitry to enable a double-talk mode and to provide a hangover time interval when outgoing signal amplitude falls below incoming signal amplitude during double-talk.

Figure 1:
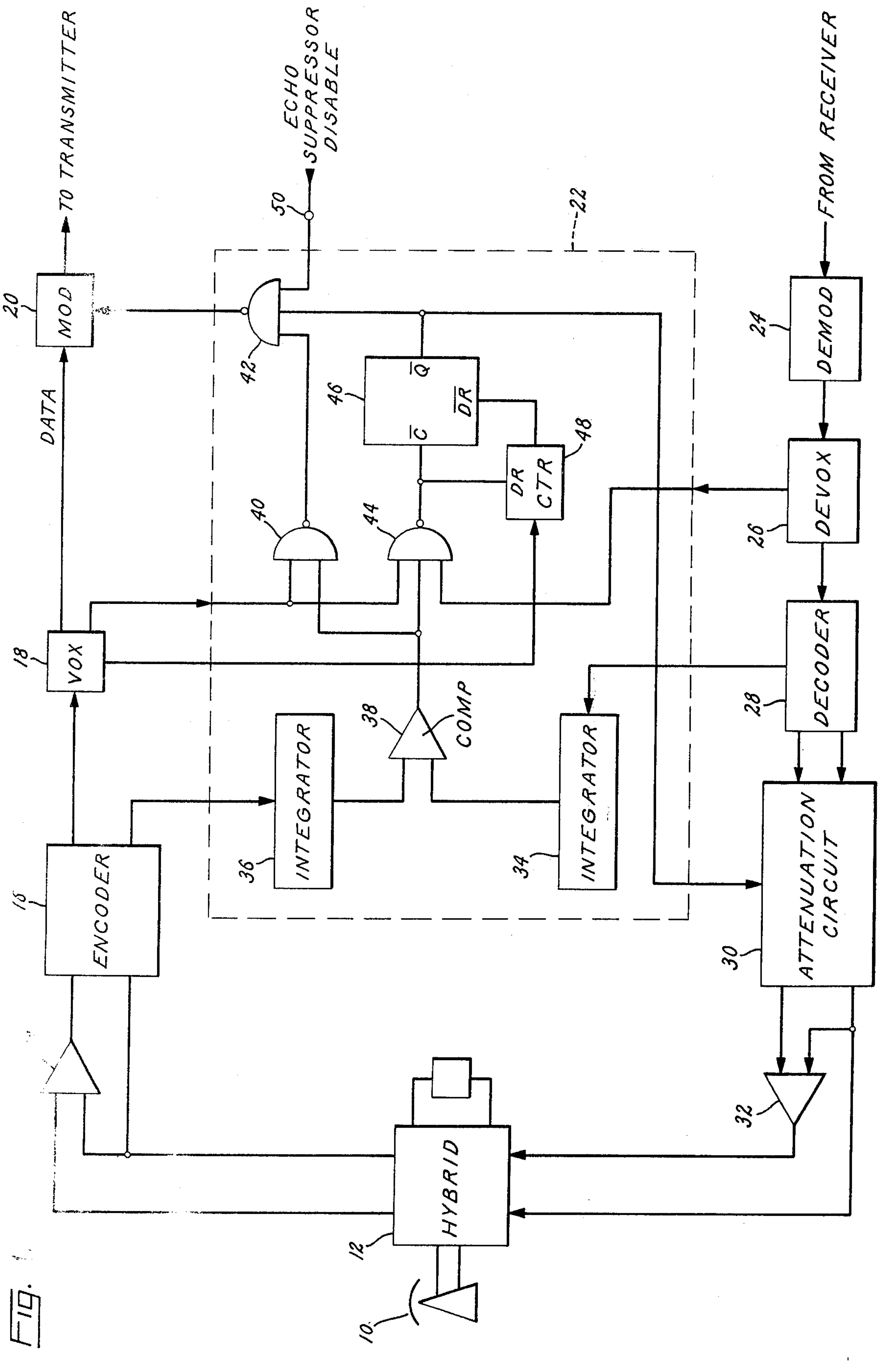
FIG. 1 is a simplified block diagram of a portion of a digital communication system utilizing a voice-operated switch in combination with an echo suppressor of the present invention.

DESCRIPTION OF THE PREFERRED EMBODIMENTS:

Referring now to the drawings, FIG. 1 is a simplified block diagram of a portion of a typical communication system in which analog data is converted into digital form for transmission as a digital signal and conversely digital data is received and converted to analog form for communication to a subscriber. Although the interconnections between the individual blocks of FIG. 1 are shown as only single lines, it is to be understood that each of the single lines may represent a plurality of electrical interconnection lines. Analog communication signals from a subscriber indicated generally at 10 are connected via interface block 12 and amplifier 14 to an input terminal of encoder 16. Encoder 16 converts the analog signals into digital signals. The digital signals are then directed into voice-operated switch (VOX) 18. Voice-operated switch 18 detects the incoming digital signals and normally provides an output signal directly to modulator 20 to enable transmission of the digital signals. However, in order to simplify implementation of echo suppression, the output signal from voice-operated switch 18 is directed into a first input terminal of echo suppressor circuit 22. The echo suppressor 22 is connected to respond to the output signal from voice-operated switch 18 and supply an enable command to modulator 20 only when no signals are being received or when the transmit signals from encoder 16 are of greater amplitude than the received signals.

Received signals are demodulated in demodulator 24 and supplied to a voice-operated switch (DEVOX) 26. Voice-operated switch 26 is connected to supply a signal to a second input terminal of echo suppressor 22 to indicate when information is being received. The data out-put of voice-operated switch 26 is directed into a decoder 28 which converts the digital information into an analog signal. The analog signal from decoder 28 is communicated to the subscriber 10 through an attenuation circuit 30 and amplifier 32 and interface block 12. Attenuation circuit 30 is of a type well-known in the art for switching an attenuator into series arrangement between an output terminal of decoder 28 and an input terminal of amplifier 32. Amplitude of the received signal is determined by supplying an output signal from decoder 28 to echo suppressor 22. As indicated in FIG. 1, the echo suppressor is also connected to receive a signal from encoder 16 representative of the amplitude of the signals which are to be transmitted.

The signals to the echo suppressor from decoder 28 and from encoder 16 are both digital signals and are supplied to respective integrators 34 and 36. Output signals from integrators 34 and 36 represent voice activity in the receive and transmit channels, respectively, and are compared in comparator 38. Comparator 38 provides an output signal of first logical significance if activity in the receive channel is greater than activity in the transmit channel and provides an output signal of second logical significance if activity in the transmit channel is greater than activity in the receive channel. In the embodiment shown wherein NAND gates are utilized as logic elements, the signal of first logical significance is a logic 0 and the signal of second logical significance is a logic 1. However, it is to be understood that any combination of logic circuitry could be utilized with appropriate adjustment of the logical significance of the digital signals being interconnected. In order to prevent modulator 20 from being enabled when the signals from the transmit channels represent echo rather than actual information, which is the probable situation when activity in encoder 16 is less than activity in decoder 28, the output of comparator 38 is connected into a first input terminal of NAND gate 40. As can be seen, the second input terminal of NAND gate 40 is connected to receive the output signal from voice-operated switch 18. The output of NAND gate 40 is connected into a first input terminal of NAND gate 42 and the output of NAND gate 42 supplies an enable signal to modulator 20.

To enable a double-talk mode, a condition in which both receive signals and transmit signals are allowed to be communicated simultaneously, the output signals from voice-operated switch 18, voice-operated switch 26 and comparator 38 are ANDed in NAND gate 44. NAND gate 44 provides an output clock signal to a multivibrator, such as, e.g., a flip-flop indicated at 46, which signal causes flip-flop 46 to go to a set condition and provide a signal to NAND gate 42 to force gate 42 to provide an enable signal to modulator 20. A counter 48 provides the hangover time necessary to prevent dropout of modulator 20 during short pauses in speech or when very soft syllables are compared. Counter 48, connected to be controlled by the output signal from NAND gate 44, supplies a direct reset signal to flip-flop 46 a predetermined time period after removal of the clock pulse from the output of NAND gate 44.

In some applications, the communication system of the type shown in FIG. 1 is utilized to communicate digital information between two electronic devices such as, for example, a pair of distantly located computers. In such use, it is desirable that digital signals be transmitted and received simultaneously. It is necessary in such case to disable echo suppressor operation. Accordingly, an echo suppressor disable terminal 50 is provided to allow a signal to be supplied to echo suppressor 22 to disable echo suppressor operation and provide a transmit command via NAND gate 42 to modulator 20.

As is well-known in the art, in the double-talk mode it is advantageous to provide an attenuator in the receive channel of the communication system to minimize echo propagation when both the receive and transmit channels are enabled. Accordingly, the output signal from flip-flop 46 is supplied to attenuation circuit 30. Since the circuitry shown in FIG. 1 is preferably available at both the near-end subscriber indicated at 10 and a far-end subscriber (not shown), any echo incurs at least twice as much attenuation as incurred by a communication signal. For example, if attenuation circuit 30 provides 6 db attenuation, a communication signal will be attenuated 6 db whereas an echo will be attenuated by 12 db since the echo signal must be propagated through a complete circular path and thus passes through two attenuators.

Figure 2:
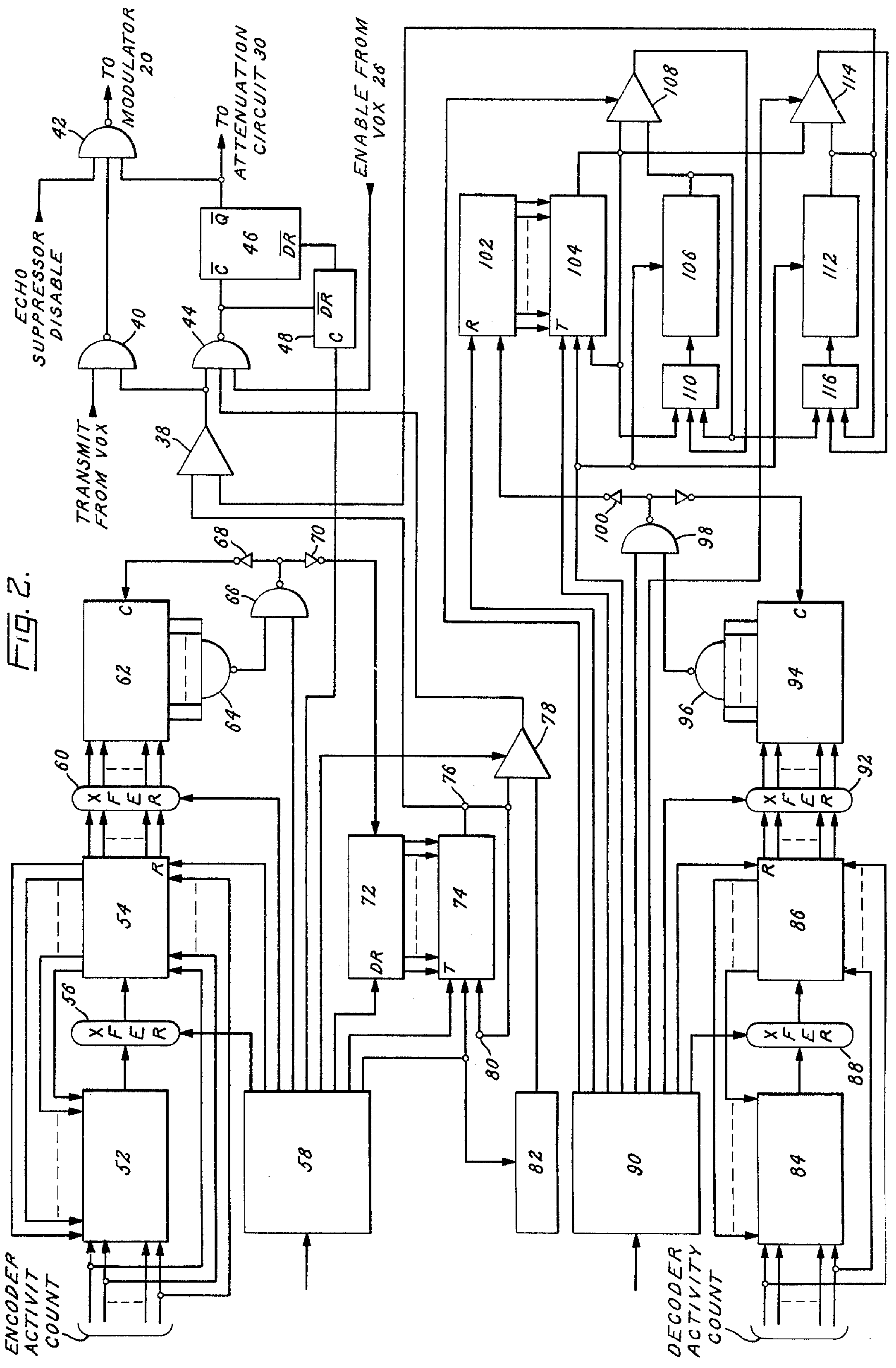
FIG. 2 is a detailed block diagram of the echo suppressor shown in FIG. 1.

Referring now to FIG. 2 there is shown a more detailed block diagram of the echo suppressor 22 of FIG. 1. Although the echo suppressor of the present invention is adaptable for use in any type of digital communication system utilizing voice-operated switches in both the receive and transmit channels, it is particularly useful in a delta modulation communication system in which the encoder and decoder use companding techniques. For a better understanding of such a delta modulation system, reference may be had to the copending application of David F. Hoeschele, Jr., Ser. No. 379,435 filed July 16, 1973 and assigned to the assignee of the present invention. In a delta modulation system utilizing companding techniques, an updown counter is generally provided in the encoder, and the decoder to control the incremental step size which is varied as a function of the rate of change of the amplitude of incoming signals to the encoder. Consequently, the content of the updown counter is proportional to the analog activity which is being processed. Therefore, the digital word stored in the updown counter may be used as an indication of encoder or decoder activity.

Continuing now with FIG. 2, a comparator 52 is connected to receive the digital word from the updown counter in encoder 16 on a first set of input terminals and connected to receive a second digital word from a parallel input/parallel output storage register 54 on a second set of input terminals. Comparator 52 provides an output signal of first logical significance when the digital word received on the first set of input terminals is of greater amplitude than the digital word received on the second set of input terminals and provides a signal of second logical significance when the digital word on the first set of input terminals is of equal amplitude or of smaller amplitude than the digital word received on the second set of input terminals. The output of comparator 52 is directed into transfer gate 56 which may comprise, for example, an AND gate having a first input terminal connected to receive the output signal from comparator 52 and a second input terminal connected to receive a clock signal from a timing generator 58 such that an output signal from transfer gate 56 can be timed to occur on a particular clock signal. The output signal from transfer gate 56 is connected to control the update cycle of register 54. Register 54 is also connected to receive on its parallel input terminals the digital word from encoder 16, which is used as an input to comparator 52. The contents of register 54 are connected to be fed back in parallel arrangement to the second set of input terminals of comparator 52 for comparison with the input to comparator 52 from encoder 16. If the input from encoder 16 is larger than the contents of register 54, comparator 52 generates an output signal of first logical significance, which output signal is detected by transfer gate 56. Upon receipt of a clock signal from generator 58, transfer gate 56 produces an enable signal causing transfer of the input from encoder 16 into register 54 so that the largest digital word detected during a predetermined time period is always stored in register 54.

At the end of each predetermined time period, during which period a predetermined number of comparisons have been made, the contents of register 54 are transferred through transfer gate 60 into downcounter 62. The transferred word represents the largest digital word detected during the immediately preceding predetermined time period. Transfer is effected by a transfer pulse from generator 58 to transfer gate 60. Immediately after transfer occurs, generator 58 supplies a reset pulse to register 54 and the comparison process described above is repeated. Transfer gate 60 may comprise, for example, a plurality of AND gates in which each AND gate has one input terminal connected to receive one of the output signals from register 54 and a second input terminal connected to receive the transfer pulse at a predetermined clock time.

Downcounter 62 is of a type well-known in the art having a plurality of output terminals enabling one to read the digital content of the counter. The output terminals of counter 62 are connected to the input terminals of NAND gate 64. An output terminal of NAND gate 64 is connected to a first input terminal of NAND gate 66. A second input terminal of NAND gate 66 is connected to receive a continuous series of clock pulses from timing generator 58. In order to count out the contents of counter 62, an output terminal of NAND gate 66 is connected in a feedback loop through an inverter 68 to a clock terminal of counter 62. Thus, each clock pulse passed through NAND gate 66 reduces the count in counter 62 by 1 until a number of clock pulses equal to the count stored in counter 62 have been passed through NAND gate 66.

The clock pulses, in addition to going to counter 62, are directed via a second inverter 70 into an integrating counter 72 where the clock pulses are accumulated for a plurality of time periods. Although referred to as an integrating counter, counter 72 is merely a digital counter of the type wellknown in the art having a single input terminal for receiving clock pulses and a plurality of parallel output terminals for reading out the contents of the counter. In order to read out the accumulated count, the output terminals of counter 72 are connected to corresponding ones of the input terminals of register 74. Register 74 may comprise, for example, a parallel-to-serial digital shift register having capability for recirculating data through external connection. Register 74 is capable of being clocked to provide in serial form the accumulated count, hereinafter referred to as a parallel digital word, last transferred into the register from counter 72. Output terminal 76 of register 74 is connected to a first input terminal of comparator 78 and to terminal 80 at the most significant bit (MSB) end of register 74. The connection from terminal 76 to terminal 80 of register 74 provides recirculation of the data in register 74 so that the data is not lost when it is read out for use in comparator 78.

A second input terminal of comparator 78 is connected to receive a digital word representing threshold noise level from register 82. Although shown as a separate entity, register 82 merely provides a threshold level code to determine when the activity as detected in register 74 is greater than minimum threshold noise level. Consequently, since the same function must also be provided in voice-operated switch 18, the threshold level code may be provided from switch 18 rather than from a separate register.

Comparator 84 is identical to comparator 52 and is provided with a first plurality of input terminals for monitoring the contents of an updown counter in decoder 28. The digital word from decoder 28 is also connected into a plurality of input terminals of parallel input/parallel output shift register 86. Output terminals of register 86 are connected to corresponding ones of a second plurality of input terminals of comparator 84. Comparator 84 provides an output signal to a transfer gate 88 when the digital word on the first plurality of input terminals is larger than the digital word on the second plurality of input terminals. Timing generator 90 provides an enable signal to transfer gate 88 to allow the output signal from comparator 84 to be gated to register 86 at a predetermined clock time. The transfer signal from transfer gate 88 is effective to cause the digital word which is being detected on the first plurality of input terminals of register 86 to be transferred into that register. As was done with comparator 52 and register 54, the selection process in comparator 84 and register 86 continues for a predetermined number of clock times and is effective to select the largest digital word detected during that clock time. At the end of the clock time period, a transfer signal from timing generator 90 to transfer gate 92 is effective to cause the transfer of the word stored in register 86 at that time into downcounter 94. Immediately after transfer of the digital word from register 86 into downcounter 94 a reset pulse from timing generator 90 causes register 86 to be reset to a "0" state so that a second digital word can be selected during a second predetermined time period.

Downcounter 94 is identical to downcounter 62 and is connected through a first NAND gate 96 and a second NAND gate 98 to convert the parallel digital word stored in counter 94 into a serial digital word at the output of NAND gate 98 which is communicated by inverter 100 to an input terminal of counter 102. After a predetermined number of digital words have been accumulated in counter 102, a transfer signal from timing generator 90 to register 104 causes the count from counter 102 to be transferred into register 104. Immediately after transfer occurs a reset signal from timing generator 90 to counter 102 resets counter 102 to the "0" state.

In order to set a threshold level representative of activity in the receive channel, it is necessary to select the digital word representing the largest amplitude signals as they appear in register 104 during a predetermined time period. As will be obvious to those skilled in the art, it is necessary to select the largest word because, although the count in counter 102 represents an integration of activity, the integration process is occurring over such short intervals and at such a high rate that at least some integration samples will occur during a time period when no communication activity is occurring and, thus, will be indicative only of noise in the system, whereas the larger amplitude signals will represent actual communication activity. Therefore, after each transfer of the count from counter 102 into register 104 the contents of register 104 are compared to the contents of register 106 in a digital comparator 108. If the contents of register 104 are greater than the contents of register 106, comparator 108 produces a gating signal to logic circuit 110 which enables logic circuit 110 and allows the contents of register 104 to be serially clocked into register 106 through logic circuit 110. Logic circuit 110 may comprise, for example, a steering logic circuit of a type well-known in the art. In the absence of a gating signal from comparator 108, which would occur if the contents of register 106 were larger than the contents of register 104, the gating logic circuit is in a state such that the contents of register 106 are simply recirculated during the comparison process. In order to assure that the word stored in register 106 is representative of the actual activity being detected in the receive channel, the contents of register 106 are periodically updated by transferring the contents of register 104 into register 106 regardless of the relative amplitude of the words in the two registers. This transfer is accomplished by a clock pulse from timing generator 90 to comparator 108 at the end of each predetermined time period. However, to assure that no echoes are sent through the transmit channel in the event that the contents of register 104 at the time update is to occur are much smaller than the contents of register 106, the contents of register 106 are transferred into register 112 just prior to the update of register 106 by the contents of register 104. Transfer of the contents of register 106 into register 112 is effected by a logic pulse from timing generator 90 to comparator 114 which forces the output of comparator 114 to provide a gating signal to logic circuit 116. Logic circuit 116 is a steering logic circuit of the same configuration as logic circuit 110 and is connected to receive the contents of register 106 on a first input terminal and is responsive to the output signal from comparator 114 to transfer the contents of register 106 into register 112. Between update periods, the contents of register 104 are compared with the contents of register 112 in comparator 114, comparator 114 producing an output signal to gate the contents of register 106 into register 112 via logic circuit 116 only if the contents of register 104 are larger than the contents of register 112. Of course, this transfer will occur only if the contents of register 104 are also larger than the contents of register 106 and requires that the contents of register 104 be first transferred into register 106 and then transferred into register 112. If during the comparison process, the contents of 112 are larger than the contents of register 104, the output signal from comparator 114 will be of such logical significance that the logic circuit 116 will be effective only to recirculate the data from the output of register 112 through the second input terminal of circuit 116 and back into register 112. Clocking of data through registers 104, 106 and 112 is accomplished by a plurality of groups of shift pulses supplied to each of the registers by timing generator 90.

The contents of register 74 representing activity in the transmit channel and the contents of register 112 representing activity in the receive channel are compared on a bit-by-bit basis in comparator 38. Comparator 38 is effective to compare the entire contents of the two registers and to produce an output signal at the end of the comparison process indicative of the relative value of the digital words stored in each of the registers as was discussed with reference to FIG. 1. If the contents of register 74 are larger than the contents of register 112, the output of comparator 38 will be a logic 1. Consequently, if voice-operated switch 18 produces a transmit signal indicating that the activity in the transmit channel is greater than the threshold noise level, the transmit signal will appear as a logic 1 on a first input terminal of NAND gate 40 and the logic 1 from the output of comparator 38 will be received at a second input terminal of NAND gate 40. These two signals will force the output of NAND gate 40 to go to a logic O. As the output terminal of NAND gate 40 is connected to a first input terminal of NAND gate 42, the logic 0 from NAND gate 40 will force the output of NAND gate 42 to go to a logic 1. The output signal from logic gate 42 is utilized to supply a transmit signal to modulator 20. Therefore, under the conditions described the transmit signal from voice-operated switch 18 is conducted through NAND gates 40 and 42 and is supplied directly to modulator 20. If, however, the output signal from comparator 38 is a logic 0 indicating that the contents of register 74 are less than the contents of register 112, NAND gate 40 will be inhibited by the logic 0 and the transmit channel will not be enabled by the output signal from voice-operated switch 18. Therefore, in order to transmit at the same time that communication signals are being received, it is necessary for the transmitted signal to be of greater amplitude than the received signal and requires that the echo suppressor go into a double-talk mode. When communication information is being received, voice-operated switch 26 supplies an enable signal to decoder 28 in order to initiate conversion of the received digital signals to analog signals. The same signal from voice-operated switch 26 is supplied to echo suppressor circuit 22 in order to enable the double-talk mode when both received and transmit information is being processed. The enable signal from switch 26 is ANDed in NAND gate 44 with the output signal from comparator 38 and the output signal from comparator 78. When all three of these signals assume a logic 1, thereby indicating that both transmit and receive activity is present, the output of NAND gate 44, which is connected to the clock input terminal of flip-flop 46, goes to a logic 0 state causing flip-flop 46 to be set. The $\overline{Q}$ output of flip-flop 46 provides a signal to attenuation circuit 30 to cause a fixed attenuator to be inserted in the receive line in the double-talk mode. The $\overline{Q}$ output is also connected to an input terminal of NAND gate 42 to force the output of NAND gate 42 to a logic 1 state to thereby enable modulator 20 and allow transmission of information. Hangover time for flip-flop 46 is provided by counter 48. Counter 48 is connected to supply a direct reset signal to flip-flop 46 at the end of a predetermined time period. During double-talk mode the output signal from NAND gate 44 is supplied as a direct reset signal to counter 48 to inhibit counting thereby preventing flip-flop 46 from being reset. Clock signals to counter 48 are supplied by timing generator 58.

OPERATION

Although it will be apparent in the following discussion that the timing of the various functions is strictly a matter of design choice, for purposes of clarity a particular set of values will be assumed. Comparator 52 continuously monitors the digital word from encoder 16 which, although preferably a companding word, may be any digital word representative of encoder activity and thus indicative of the presence of communication signals. Since the clock pulses utilized in the echo suppressor circuit 22 are also utilized in the encoder, the operation of the comparator is coordinated with the changing of the output word from encoder 16. Assuming that upon initial turn-on the contents of register 54 are a digital 0, upon receipt of the first word from encoder 16 greater than 0, the output signal of comparator 52 will assume a first logical significance, for example, a logic 1, and will provide the logic 1 signal to transfer gate 56. The first clock pulse after receipt of the logic 1 signal from comparator 52, the output of transfer gate 56 will go to a logic 1 and this logic 1 will be detected by register 54 and will effect transfer of the digital output of the encoder into register 54. In this particular embodiment, reset of register 54 is set to occur every 32 clock pulses. Therefore, the comparison process will continuously repeat for 32 clock times, that is, comparator 52 will continuously monitor the encoder word and compare it with the contents of register 54 providing an output signal to transfer the encoder word into register 54 whenever the contents of register 54 are smaller than the encoder word then being received. Thus, at the end of 32 clock pulses register 54 will contain the largest encoder word received during the preceding 32 clock times. At the end of this 32 clock time period, a transfer pulse is sent to transfer gate 60 thereby transferring the contents of register 54 into downcounter 62. A reset pulse delayed from the transfer pulse but prior to a succeeding clock pulse is then sent to register 54 which thereby resets register 54 to a "0" condition in preparation for repeat of the above-described operation.

Assuming, as is the most probable case, that the contents of register 54 during a 32 clock pulse period were not at all times 0, down counter 62 will be set some seome significant count. In the embodiment shown, the output signals from counter 62 are taken from the reset terminals of the various stages of the counter; therefore, when the counter counts down to 0 the output signals will all go to logic 1. With a count in the counter, at least one of the output signals will be a logic 0; consequently, the output from NAND gate 64 will be a logic 1. The logic 1 output from NAND gate 64 connected to a first input of NAND gate 66 acts as a switch to turn NAND gate 66 on and allow the clock pulses on the second input terminal of NAND gate 66 to be passed through NAND gate 66 where they are inverted and fed back to the clock inputs of down counter 62 to begin counting it down to a "0" state. As can be seen, the number of clock pulses allowed to pass through NAND gate 66 will be equal to the count in counter 62 since once that number of clock pulses have been passed through NAND gate 66, the counter 62 will be reset to a "0" condition and all the inputs to NAND gate 64 will be logic 1's thereby providing a 0 output from NAND gate 64 and shutting off NAND gate 66.

The count pulses from NAND gate 66 are accumulated in integrating counter 72. Counter 72 is controlled by a reset pulse from timing generator 58 which occurs, in the particular embodiment described, approximately every 25 milliseconds or, at a 40 kilohertz clock rate, every 1024 counts. Counter 72 therefore accumulates 32 sets of counts received from down counter 62 through NAND gate 66. At the end of 25 milliseconds a transfer signal, shown as an input to register 74 allows transfer of the accumulated contents of counter 72 into register 74. At this point in time, register 74 now holds a count representative of the integrated activity occurring in encoder 16 over the last 25 millisecond time period. Immediately after the transfer of the contents of counter 72 into register 74, a reset signal to counter 72 resets that counter back to a "0" state in preparation for a repetition of the above-described operation; i.e., counter 72 begins again to integrate the count being detected in encoder 16 during a subsequent 25 millisecond period.

On the first clock pulse after receipt of the transfer pulse, a compare shift series of clock pulses from timing generator 58 is directed into registers 74 and 82. The compare shift clock pulses cause the contents of each of the registers to be sequentially clocked in recirculating fashion through the respective output terminals, thereby allowing the contents of the registers to be compared in comparator 78 on a bit-by-bit basis. Immediately after completion of the comparison process, a compare strobe pulse is supplied from timing generator 58 to comparator 78 to cause the results of the comparison process to be read out of the output terminal of comparator 78 and supplied to NAND gate 44.

Comparator 84 and register 86, which are connected to monitor the activity in the receive channel, operate in a manner identical to the operation of comparator 52 and register 54. Likewise, the operation of counter 94, logic gates 96 and 98, counter 102 and register 104 are identical to operation of corresponding elements 62, 64, 66, 72 and 74 in the transmitter activity monitoring circuitry. Therefore, beginning with register 104 immediately after transfer of the contents of counter 102 into register 104 at which point in time register 104 holds a count representative of the integrated activity occurring in decoder 28 for the last 25 millisecond time period, the contents of register 104 are compared in comparator 108 on a bit-by-bit basis with the contents of register 106. If the contents of register 104 are larger than the contents of register 106, comparator 108 provides an output signal to logic circuit 110 which causes the contents of 104 to be transferred into register 106 during the next sequence of compare shift clock pulses from timing generator 90. Similarly, the contents of register 104 are also compared with the contents of register 112 in comparator 114 and comparator 114 provides an enable signal for logic circuit 116 to allow the contents of register 104 to be clocked into register 112 when the contents of register 104 are larger than the contents of register 112.

At the end of a predetermined time period, for example, 100 milliseconds, which time period is selected to approximate the time for a signal to be propagated through the receive channel and out through the transmit channel as an echo, an update pulse is supplied to comparator 114 and to comparator 108 in timed relationship such that the contents of register 106 are transferred via logic circuit 116 into register 112 and the contents of register 104 are transferred via logic circuit 110 into register 106. This process assures that the largest integrated count detected during a preceding 100 millisecond time period is stored in register 112 for a succeeding 100 millisecond time period to assure that no echoes will be transmitted at the trailing edge of receive signals when the received information drops to a very low amplitude.

The contents of register 112 are compared in comparator 38 with the contents to register 74 and a logic 1 signal is produced as an output from comparator 38 if the contents of register 74 are greater than the contents of register 112. This indicates that the information in the transmit channel is actually communication signals and not echo. This logic 1 signal is supplied to NAND gate 40 and when combined with a transmit command from voice-operated switch 18 produces a logic 0 output signal from NAND gate 40 which forces the output of NAND gate 42 to a logic 1 to thereby enable the transmitter. If, however, the contents of register 112 are greater than the contents of register 74, the output of comparator 38 will be a logic 0 and will inhibit operation of NAND gate 40 thereby precluding modulator 20 from being enabled and no transmission will occur.

In the situation where a receive signal is being detected from a far-end subscriber, it is necessary for the near-end subscriber to talk louder than the receive signal in order to be able to break into the received conversation. The break-in situation or double-talk mode is provided by NAND gate 44 and flip-flop 46. If voice-operated switch 26 is enabled thereby indicating that received information is coming in, a logic 1 signal will be supplied to NAND gate 44. If at the same time the output of comparator 78 and the output of comparator 38 are logic 1's indicating that transmit is greater than receive and that transmit is greater than threshold noise level, the output of NAND gate 44 will go to a logic 0 thereby clocking flip-flop 46 to the set condition and providing a logic 0 output to NAND gate 42 and to attenuation circuit 30. The logic 0 to attenuator circuit 30 will cause insertion of an attenuator into the receive path while the logic 0 to NAND gate 42 will force the output of NAND gate 42 to a logic 1 state thereby enabling modulator 20. Counter 48 is inhibited from resetting flip-flop 46 by the output signal from NAND gate 44. However, as soon as one of the conditions which created the logic 1 inputs to NAND gate 44 is changed, the output of NAND gate 44 will go to a logic 1 thereby removing the direct reset command from counter 48 and allowing it to begin counting to a predetermined count before resetting flip-flop 46 and removing the double-talk commands to attenuation circuit 30 and NAND gate 42.

Commercially available integrated circuit units provide shift registers, counters, OR gates, AND gates, and complemented gates referred to as NOR gates and NAND gates. For the purpose of description of the manner of operation of the invention, a combination of complemented and non-complemented logic gates have been described. However, the manner of employing such devices to perform the logical operations included herein is part of the well-known art and the use of a particular logic device is not to be considered a limiting embodiment.

It is also part of the known art that the application of clock pulses to certain components may have to be delayed, particularly in high speed operation, to permit other components to change their state or condition. Since the delay required in any given case will be a function of the speed of operation of the components employed, it is not possible to specify these delays, the provision of which is part of the known art.

As certain changes may be made in the above constructions without departing from the spirit and scope of the invention, it is intended that all matter contained in the above description and shown in the accompanying drawing shall be interpreted as illustrative and not in a limiting sense.

What is claimed as new and desired to be secured by Letters Patent of the United States:

1. In a communication system having means for interconnecting a two-wire circuit to a four-wire circuit wherein said four-wire circuit comprises separate two-wire paths for transmission and reception of signals and includes a voice-operated switch in each path for normally open circuiting each of said paths, a digital echo suppressor comprising:

first means for comparing outgoing signals with incoming signals, said first means producing a signal of first logical significance when said outgoing signals are of greater amplitude than said incoming signals and producing a signal of second logical significance when said outgoing signals are of lesser amplitude than said incoming signals;

second means responsive to said signal of second logical significance for establishing a first condition wherein said voice-operated switch in said transmission path is precluded from enabling said transmission path;

third means responsive to said signal of first logical significance and to said incoming and said outgoing signals for establishing a second condition wherein said voice-operated switch in said transmission path is not precluded from enabling said transmission path and a predetermined impedance is inserted in said two-wire reception path; and fourth means for maintaining said second condition for a predetermined time interval after said first output signal terminates.

2. In a delta modulation communication system including an encoder and voice-operated switch in a transmission path and a decoder and voice-operated switch in a reception path, a digital echo suppressor comprising:

first means connected to monitor activity in said encoder and to provide a first digital word representative of activity in said transmission path;

second means for comparing said first digital word to a digital threshold level and for producing an output signal of first logical significance when said first digital word is smaller than said threshold level and for producing an output signal of second logical significance when said first digital word is larger than said threshold level;

third means connected to monitor activity in said decoder and to provide a second digital word representative of activity in said reception path;

fourth means connected to receive said second digital word and for selecting the largest of said second digital words detected during a first predetermined time period;

fifth means connected to receive and store said largest of said second digital words for a second predetermined time peeriod;

sixth means connected to receive and compare said first digital word and said largest of said second digital words, said sixth means providing an output signal of first logical significance when said first digital word is smaller than said largest of said second digital words and providing an output signal of second logical significance when said first digital word is larger than said largest of said second digital words;

seventh means connected to receive said output signals from said sixth means, said seventh means being responsive to said signal of first logical significance to inhibit said voice-operated switch in the transmission path from enabling said transmission path and being responsive to said signal of second logic significance to remove said inhibit.

3. The improved echo suppressor as defined in claim 2 and including eighth means for inhibiting said echo suppressor operation when communication activity is present in both said transmission path and said reception path.

4. The echo suppressor as defined in claim 2 wherein said fourth means comprises:

a first steering logic circuit having first, second and third input terminals and an output terminal, said first input terminal of said first logic circuit being connected to receive said second digital word;

a first recirculating shift register for storing a third digital word representing the largest of said second digital words detected during a first predetermined time period, said first register having an input terminal and an output terminal, said output terminal of said first register being connected to said second input terminal of said first logic circuit, said output terminal of said first logic circuit being connected to said input terminal of said first register;

a first comparator having first and second input terminals and an output terminal, said first input terminal of said first comparator being connected to receive said second digital word and said second input terminal of said first comparator being connected to said output terminal of said first register, said output terminal of said first comparator being connected to said third input terminal of said first logic circuit, said first comparator producing an output signal of first logical significance when said second digital word is smaller than said third digital word and producing an output signal of second logical significance when said second digital word is larger than said third digital word; and wherein said first logic circuit is responsive to said signal of second logical significance to transfer said second digital word into said first register and is responsive to said signal of a first logical significance to cause said third digital word to be recirculated.

5. The echo suppressor as defined in claim 4 wherein said fifth means comprises:

a second recirculating shift register having an input terminal and an output terminal;

a second steering logic circuit having an output terminal and first, second and third input terminals, said output terminal of said second logic circuit being connected to said input terminal of said second register, said first input terminal of said second logic circuit being connected to said output terminal of said second register and said second input terminal being connected to said output terminal of said first register;

a second comparator connected to compare said second digital word and said third digital word, said comparator connected to supply a signal to said second steering logic circuit to cause said second digital word to be transferred into said second register when said second digital word is larger than said third digital word; and means for supplying a periodic update signal to said third input terminal of said second logic circuit to cause said third digital word to be transferred from said first register into said second register.

6. The echo suppressor as defined in claim 5 wherein said sixth means comprises a third comparator.

7. The echo suppressor as defined in claim 6 wherein said seventh means comprises a first logic gate having a first input terminal connected to receive said signal from said comparator and a second input terminal connected to receive an enable signal from said voice-operated switch in said transmission path, and wherein said first logic gate is responsive to said signal of first logical significance to inhibit said enable signal.

8. The echo suppressor as defined in claim 7 wherein said eighth means comprises:

a second logic gate having first, second and third input terminals and an output terminal, said first input terminal being connected to receive said output signal from said third comparator, said second input terminal being connected to receive said output signal from said second means, and said third input terminal being connected to receive said enable signal from said seventh means, said logic gating providing an output signal of first logical significance upon simultaneous receipt of input signals of second logical significance on each of said input terminals;

a counter having a clock terminal, a reset terminal and an output terminal, said counter being connected to receive said clock pulses on said clock terminal and being responsive thereto to provide an output signal at said output terminal after receipt of a predetermined number of said clock pulses, said reset terminal being connected to said output terminal of said second logic gate wherein said counter is responsive to said signal of first logical significance from said second logic gate to be reset to terminate said output signal and to be maintained in said reset state until said signal of first logical significance on said reset terminal is terminated;

a multivibrator having a clock terminal, a reset terminal and an output terminal, said reset terminal being connected to said output terminal of said counter, and said clock terminal being connected to said output terminal of said second logic gate wherein said multivibrator provides an output signal of first logical significance in response to said signal of first logical significance on said clock terminal and provides an output signal of second logical significance in response to said signal of first logical significance on said reset terminal; and a third logic gate having a first input terminal connected to receive said enable signal from said first logic gate and having a second input terminal connected to receive said output signals from said multivibrator wherein said third logic gate provides an output signal in response to said enable signal on said first input terminal or said signal on said second input terminal.

9. The echo suppressor as defined in claim 8 wherein said third logic gate includes a third input terminal connected to receive a signal for disabling said echo suppressor.

* * * * *